June 16, 1925.
J. H. DEPPELER
REFRACTORY CRUCIBLE
Filed April 10, 1923
1,542,784
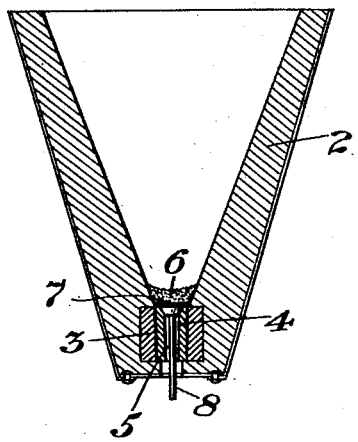
INVENTOR
BY
HIS ATTORNEY Patented June 16, 1925.

1,542,784

UNITED STATES PATENT OFFICE.

JOHN H. DEPPELER, OF WEEHAWKEN, NEW JERSEY, ASSIGNOR TO METAL & THERMIT CORPORATION, OF CHROME, NEW JERSEY, A CORPORATION OF NEW JERSEY.

REFRACTORY CRUCIBLE.

Application filed April 10, 1923. Serial No. 631,158.

*To all whom it may concern:*

Be it known that I, JOHN H. DEPPELER, a citizen of the United States, and a resident of Weehawken, in the county of Hudson and State of New Jersey, have invented certain new and useful Improvements in Refractory Crucibles; and I do hereby declare the following to be a full, clear, and exact description of the invention, such as will enable others skilled in the art to which it appertains to make and use the same.

The invention relates to certain new and useful improvements in refractory crucibles and, more particularly, to crucibles for containing or receiving molten steel or other metals, which involve extremely high temperatures in the molten metal, which high temperatures are incidentally responsible for the fusion or washing away of the surfaces of the crucible in contact with the metal bath. Steel made by any process contains more or less gaseous impurities and, in each case, steps are taken to deoxidize and purify it. The instant invention provides means for eliminating any impurities which may be contained in the molten metal within the crucible, by incorporating in the structure of the crucible, which includes the means for plugging the pouring opening in the bottom of the latter, and the thimble through which the molten metal flows, a deoxidizing or purifying agent which will be exposed to the superheated metal, slowly melted thereby and incorporated in the molten bath, to deoxidize and eliminate the impurities. Usually, the deoxidizing or purifying agent is an alloy of iron and a refractory metal, such as ferro-titanium, ferro-manganese, ferro-silicon, ferro-vanadium, ferro-chromium, or the like, which will be slowly melted by the superheated molten metal and uniformly distributed throughout the latter, thereby not only eliminating the impurities, but, when desired, adding a material amount of the refractory metal to the body of molten metal.

The deoxidizing or purifying agent may be applied as a coating to the interior of the crucible, or may be incorporated with the refractory material making up the body of the crucible, or, preferably, be associated with or forming the plugging means by which the pouring opening in the bottom of the crucible is closed, said plugging means including a removable and replaceable thimble located in the bottom opening and a body or bodies of metal cooperating with the thimble to close the opening therein. I find it practically advantageous to incorporate the purifying or deoxidizing agent in the thimble above mentioned, because, by this means, it is caused to act upon the molten metal of the crucible after the metal has quieted down, because this action will take place as the metal flows from the crucible. Furthermore, it will be more uniform because each part of the superheated metal flowing from the crucible washes away some of this thimble in passing through the orifice and, therefore, each part is uniformly acted upon by the purifying or deoxidizing agent.

The invention is illustrated in the accompanying drawing, in which the figure is a sectional elevation of a typical crucible involving the invention.

Referring to the drawing, 2 indicates the body of the crucible, comprising a generally cup-shaped shell, usually made of magnesite, provided with an opening in its bottom through which the molten metal is discharged. Surrounding the opening and incorporated within the body of the crucible is a generally cylindrical stone 3 of magnesite provided with a downwardly tapering opening to receive a similarly tapered thimble 4 having a longitudinal opening 5 therethrough which constitutes the bottom discharge opening of the crucible. In order to seal the opening and prevent the discharge of the molten metal, it has been the custom to plug the opening by means of a mass of comminuted material 6 in the bottom of the crucible, which may be refractory sand, or which may be relatively small pieces of iron or steel supported by a loose disk 7, preferably of iron or steel. Within the opening 5 is a pin 8, having a head engaging the upper tapered bore of the thimble 4, and a shank extending below the lower end of the opening in the thimble, so that, when it is desired to tap the molten metal from the crucible, a sharp upward blow on the shank of the pin will drive the same upward and displace the disk 7 and the superposed material 6, all of which is usually almost instantly melted and dissolved in the molten metal, and permits the metal to flow out.

In the operations of crucibles of this character, in carrying out the alumino-thermic reaction the very high degree of superheat produced by the reaction causes all parts of the surface of the crucible with which the molten metal is in contact, to melt or erode and commingle with the out-going metal during the tapping operation. This fact is taken advantage of in the instant invention which provides for the addition of a deoxidizing or purifying agent to the superheated molten metal, which will have the effect of reducing and eliminating the impurities from the molten metal.

Obviously, this deoxidizing or purifying material may be introduced into the bath in various ways, as, for example, by providing the crucible with a lining of the deoxidizing or purifying material, by employing the deoxidizing or purifying material as the body of the granular or subdivided material 6, which constitutes the initial plugging means for the vent opening, or by incorporating the deoxidizing or purifying material in the body of the crucible structure as a component part of the magnesite composition, of which the crucible is formed. When the deoxidizing or purifying agent is in the form of a ferro-alloy of a refractory metal, which is highly deoxidizing in character, such as ferro-titanium, ferro-manganese and ferro-silicon or ferro-vanadium, a relatively small proportion of the alloy will effect the deoxidization of the impurities, and a consequent purification of the molten metal, and, moreover, the refractory metal content of the alloy may constitute an addition to the body of superheated molten metal.

It is highly desirable that the deoxidizing material be distributed throughout the entire body of the molten metal, preferably as the latter leaves the crucible, and to effect this object, and to render the application of the invention relatively simple, expeditious and consistent with the usual practice followed in the alumino-thermic welding or casting operations, the preferred form of the invention involves the construction of the thimble 4, which is in all cases rather rapidly eroded or melted by the stream of molten metal discharging from the crucible of a deoxidizing or purifying material and, preferably, of one of the ferro-alloys of refractory metals hereinbefore referred to. These thimbles, made of the deoxidizing or purifying alloy as indicated, will replace the usual magnesite thimble heretofore employed, and when so applied, it is found that in the tapping operation, the interior of the thimble is melted away, commingles with the stream of superheated molten metal and most effectively deoxidizes and eliminates the impurities in the molten metal, so that the latter is delivered to its ultimate disposition in a practically pure state, the initial body of molten metal being augmented by the iron content of the alloy, which has been melted and washed away from the interior of the thimble. After the thimble has been so far reduced by the melting operations as to be no longer available for its intended use, it is removed by tapping on its lower end with a suitable tool and a new thimble inserted in its place.

While the particular exemplification of the invention has been described with a special reference to alumino-thermic steel or iron, it is understood that the invention is applicable to crucibles employed in the melting or reception of molten metals of other characters or kinds.

What I claim as my invention is:

1. A crucible for use with molten metal, including as a component part of the crucible structure a deoxidizing or purifying material in the form of a ferro-alloy that will be taken up by the molten metal.

2. A crucible for use with molten metal, including as a component part of the crucible structure a metallic deoxidizing or purifying material that will be taken up by the molten metal.

3. A crucible for use with molten metal, including as a component part of the discharging means of the crucible a deoxidizing or purifying material that will be taken up by the molten metal.

4. A crucible for use with molten metal, including as a component part of the discharging means of the crucible a metallic deoxidizing or purifying material that will be taken up by the molten metal.

5. A crucible for use with molten metal, having means for discharging the molten metal, said means including an opening and a displaceable closure element for said opening, the discharging means comprising a deoxidizing or purifying material that will be taken up by the molten metal.

6. A crucible for use with molten metal, having means for discharging the molten metal, said means including an opening and a displaceable closure element for said opening, the discharging means comprising a metallic deoxidizing or purifying material that will be taken up by the molten metal.

7. A crucible for use with molten metal, having a discharge opening in its bottom, and a thimble in said opening comprising in its structure a deoxidizing or purifying material that will be taken up by the molten metal.

8. A crucible for use with molten metal, having a discharge opening in its bottom, and a thimble in said opening comprising in its structure a metallic deoxidizing or purifying material that will be taken up by the molten metal.

9. A crucible for use with molten metal, having a discharge opening in its bottom, and a thimble in said opening formed of an alloy of iron and a refractory metal having deoxidizing or purifying properties.

In testimony whereof I affix my signature.

JOHN H. DEPPELER.